United States Patent
Churchett et al.

(10) Patent No.: US 7,336,044 B1
(45) Date of Patent: Feb. 26, 2008

(54) DIRECT CURRENT MOTOR CONTROL CIRCUIT

(75) Inventors: Andrew Churchett, Amelstone (AU); Donald Kay, Hilton (AU)

(73) Assignee: Visiocorp Patents S.a.r.l. (DE)

( * ) Notice: Subject to any disclaimer, the term of this patent is extended or adjusted under 35 U.S.C. 154(b) by 1371 days.

(21) Appl. No.: 10/088,767

(22) PCT Filed: Sep. 20, 2000

(86) PCT No.: PCT/AU00/01142

§ 371 (c)(1), (2), (4) Date: Mar. 19, 2002

(87) PCT Pub. No.: WO01/22569

PCT Pub. Date: Mar. 29, 2001

(30) Foreign Application Priority Data

Sep. 20, 1999 (AU) ..................... PQ2940
May 18, 2000 (AU) ..................... PQ7577

(51) Int. Cl.
*H02K 21/00* (2006.01)

(52) U.S. Cl. .................. 318/254; 318/439; 318/138; 318/280; 318/469

(58) Field of Classification Search ............ 318/254, 318/138, 439, 280, 469, 466, 286, 287; 307/140
See application file for complete search history.

(56) References Cited

U.S. PATENT DOCUMENTS

| | | | |
|---|---|---|---|
| 3,565,402 A * | 2/1971 | Linke | 254/269 |
| 4,341,985 A * | 7/1982 | Houskamp | 318/260 |
| 4,749,931 A * | 6/1988 | Kegel et al. | 318/696 |
| 4,798,967 A | 1/1989 | Yamana et al. | |
| 5,194,786 A * | 3/1993 | Smith et al. | 318/254 |
| 5,514,940 A | 5/1996 | Okamoto | |
| 5,530,327 A | 6/1996 | Vecchiarino | |
| 5,952,802 A | 9/1999 | Pimley | |
| 6,101,827 A * | 8/2000 | Burson | 62/210 |
| 6,420,804 B1 * | 7/2002 | Yoshizawa | 307/104 |

* cited by examiner

Primary Examiner—Karen Masih

(57) ABSTRACT

A DC motor control circuit includes a pair of substantially identical unipolar control circuits. Each of the unipolar control circuits are connected between a respective current source and a current input to the motor. Each of the unipolar control circuits includes a solid state switch located between a motor current input and the source of direct current. The degree to which the solid state switch allows current to flow to the motor is controlled by an input bias signal to the switch. Current limiting for adjusting the input bias signal according to the current flowing through the motor is provided in one way of controlling the motor movement.

18 Claims, 5 Drawing Sheets

DIRECT CURRENT MOTOR CONTROL CIRCUIT

This invention relates to a vehicle mirror motor control used in moving a mirror between an in-use position and a parked position, in particular to a circuit which effectively turns off electric current to the motor as the mirror reaches the end of its intended travel when being folded back or moved to an operative position. However, it will be appreciated that such a circuit is useable in other apparatus which use electric motors and require an efficient and cost effective turnoff of the kind described.

BACKGROUND

A side mounted vehicle rear view mirror is normally pivotally mounted to a vehicle mounting bracket so that it can be forwardly or rearwardly rotated relative to the vehicle. In an operative or in-use position it is located laterally of the vehicle body and in a folded or parked position is located approximately parallel to the side of the vehicle so as to prevent damage to the mirror and mirror housing. Such a folded position is useful when the vehicle is parked on narrow roadways or being taken through a car wash.

Motorised versions which fold mirrors in the manner described above are referred to as power fold mirrors and can be arranged with appropriate control electronics to move to a folded position when a button is pressed or upon the vehicle's ignition being turned off or alternatively the gear selector being placed in the parked position.

It is typical at this time for the motor used to drive the folding mechanism to be provided power until the current driving the motor is raised substantially above normal levels (over current) for a predetermined period of time. This can result from the mirror head coming against a stop. This manner of motor control is cheap to design, but not necessarily cheap to build and typically needs to include expensive transient suppression components. An alternative is to use expensive and potentially unreliable limit switches.

Furthermore, periods of over current are an undesirable feature of prior power fold mirror designs as this can ultimately lessen the life of the electric motor and its associated drive train components or can cause unexpected failure. Yet furthermore, as the effects of spurious electro-magnetic (EM) emissions are sometimes unpredictable, especially upon vehicle electronic systems, it is advantageous to eliminate or keep to an acceptable minimum this type of emission.

It is also typical that the motor used to drive powered mirrors are direct current (d.c.) motors which require a specific polarity of current to drive them in a desired direction and this tends to complicate the design of typical motor drive circuits.

It is an aim of this invention to eliminate or reduce the abovementioned problems.

BRIEF DESCRIPTION OF THE INVENTION

In a broad aspect of the invention, a motor control circuit for a direct current electric motor having a pair of direct current inputs supplied respectively from negative and positive current sources wherein the motor is actuated to turn a shaft in one of two directions dependant on which polarity of current is being provided to the motor, the motor control circuit comprising, a pair of unipolar control circuits wherein at least one of the unipolar control circuits is connected between a respective current source and a current input to the motor wherein at least one of the unipolar control circuits is adapted to operate the motor in one of the two directions, a motor control circuit wherein each of the unipolar control circuits are substantially identical, a motor control circuit wherein at least one of the unipolar control circuits further comprises, a solid state switch located between the motor current input and the source of direct current wherein the degree to which the solid state switch allows current to flow to the motor is controlled by an input bias signal to the switch, a current limiting member for adjusting said input bias signal according to the current flowing through the motor, such that the solid state switch adjusts the input bias to the solid state switch such that less current flows through the motor when a predetermined period of current limiting has occurred, and a motor control circuit wherein the current limiting member further comprises a temperature compensation circuit.

Specific embodiments of the invention will now be described in some further detail with reference to and as illustrated in the accompanying figures. These embodiments are illustrative, and not meant to be restrictive of the scope of the invention. Suggestions and descriptions of other embodiments may be included but they may not be illustrated in the accompanying figures or alternatively features of the invention may be shown in the figures but not described in the specification.

DETAILED DESCRIPTION OF AN EMBODIMENT OF THE INVENTION

Figure 1:
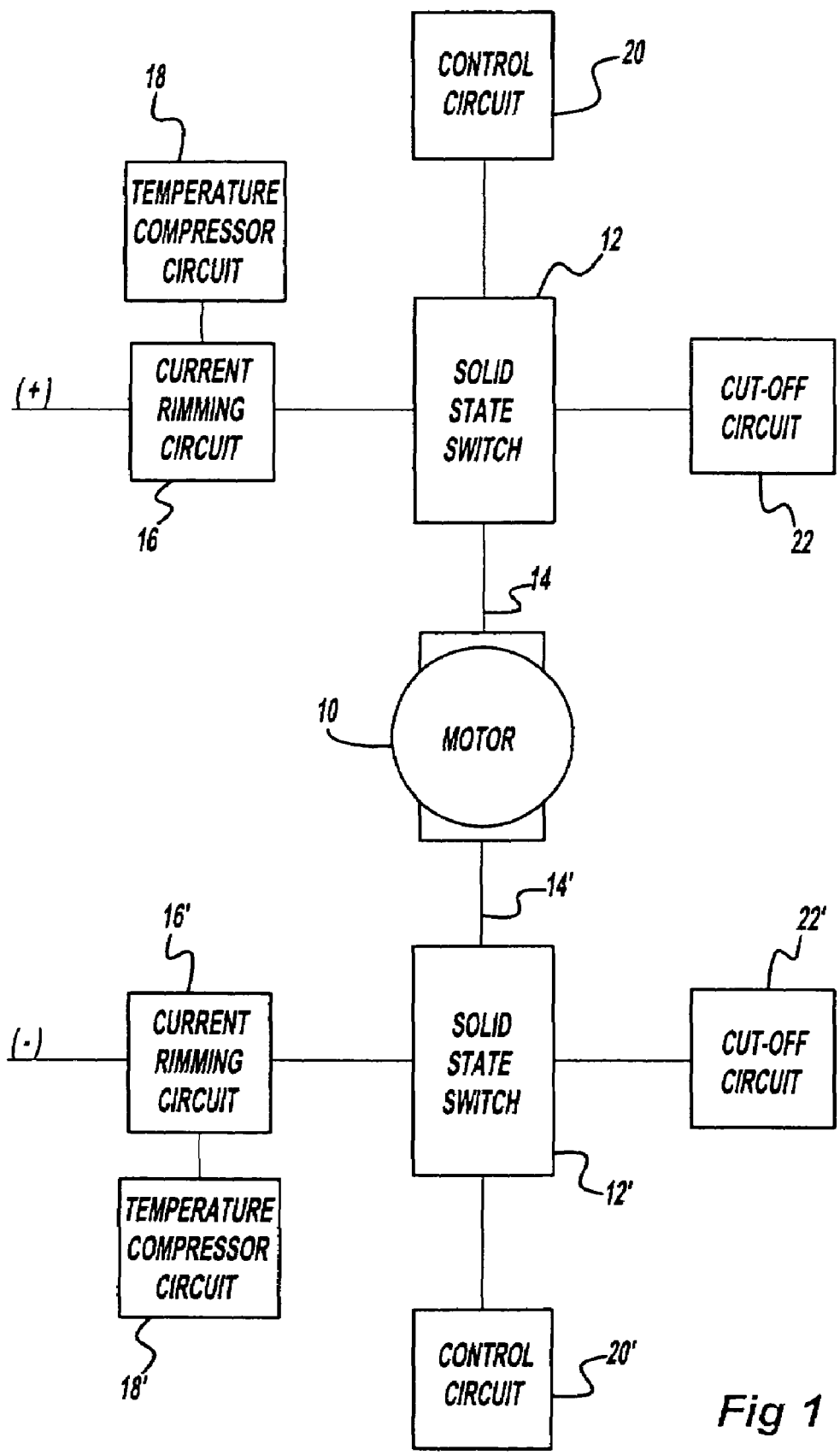
FIG. 1 depicts a functional block diagram of a motor control circuit according to one embodiment of the invention, incorporating a circuit for each direction of motor operation.

FIG. 1 depicts a functional block diagram of a motor control circuit which has been found useful to control a motor used to actuate the folding and un-folding of a mirror housing between an extended and folded position.

However, any motor which has the task of moving an element between two positions could be controlled by such a circuit. Thus, even though the description provided herein is directed to vehicular outside rear view mirrors and their fold back function, the circuit is capable of being applied to motors required to provide similar movement.

The motor 10 is located between a positive (+) and negative (−) source of electrical current and dependent on the polarity of current applied to the motor the shaft of the motor will turn in a predetermined direction. Thus to change the direction of the motor, the supply current polarity is swapped, which can be easily done by controlling the position of a vehicle driver-operated switch or switch-like device (not shown).

In the example of an outside rear view mirror housing which is foldable relative to the vehicle body between a folded position and a lateral position, a single electric motor can be connected to a mechanical member for translating the rotational motion of the motor's shaft into a movement of the mirror housing between the described positions.

In the past when the mirror housing reached the end of its travel, the motor, which is controlled with a dual polarity control circuit, would draw large amounts of current until the relatively high current being drawn was detected and used to trigger the cut-off of the supply current.

As will be provided in more detail in this application, the described embodiment of the invention illustrates features which simplify and facilitate an alternative way to control an electric motor in this example as used in a foldable vehicular outside rear view mirror.

In this invention there is use of a novel topology which includes two unipolar electronic circuits. The motor is always in circuit whether the polarity is positive or negative and the motor drive circuits are symmetric.

Also, in this invention, one approach is to switch off current to the motor after current to the motor has been limited to a maximum level for a predetermined time.

However, this is but one preferred characteristic of the motor control arrangement for determining when to switch off or substantially reduce power to the motor.

In the preferred embodiment of this invention, the circuit used to sense electric motor current usage is by way of sensing the drop of voltage across a shunt resistor with a bipolar transistor which will turn on at a predetermined voltage level.

FIG. 1 depicts two unipolar circuits one each side of the motor 10. Only one side of the circuit diagram will be described as the other side is identical. The opposite side of the circuit comes into operation upon a change of the polarity of the source current. However, it will be apparent that there is always a conduction path through the opposite side to that which is operational so as to complete the circuit back to the current source.

A solid state switch 12 is located between one of the current inputs 14 of the motor 10 and the current source.

This switch 12 is used to control the amount of current which flows through the motor as well as to switch off current to the motor once a predetermined position or the end of travel has been reached, as is the typical case or when a switch off characteristic is detected.

A current limiting circuit 16 is located between the switch 12 and the source of current, in this case a positive current terminal. To provide consistency of operation over a reasonable environmental temperature variation, a temperature compensation circuit 18 is provided, but this is an option rather than a necessity for the operation of such a motor in the majority of circumstances.

During normal operation of the motor, the switch 12 is controlled by bias control circuit 20 which ensures that the switch is set so as to pass current directly to the motor 10.

Once the mirror housing or element actuated by the motor has reached the end of its travel a prompt cut-off of current to the motor is desirable and cut-off circuit 22 performs this function based on a predetermined period of active current limiting which is provided by circuit 16 once the end of travel is approaching or reached.

In one example, when the motor is detected drawing much more current than is required to drive the motor and a predetermined threshold current is exceeded for a predetermined time, motor current switch off is initiated.

Figure 2:
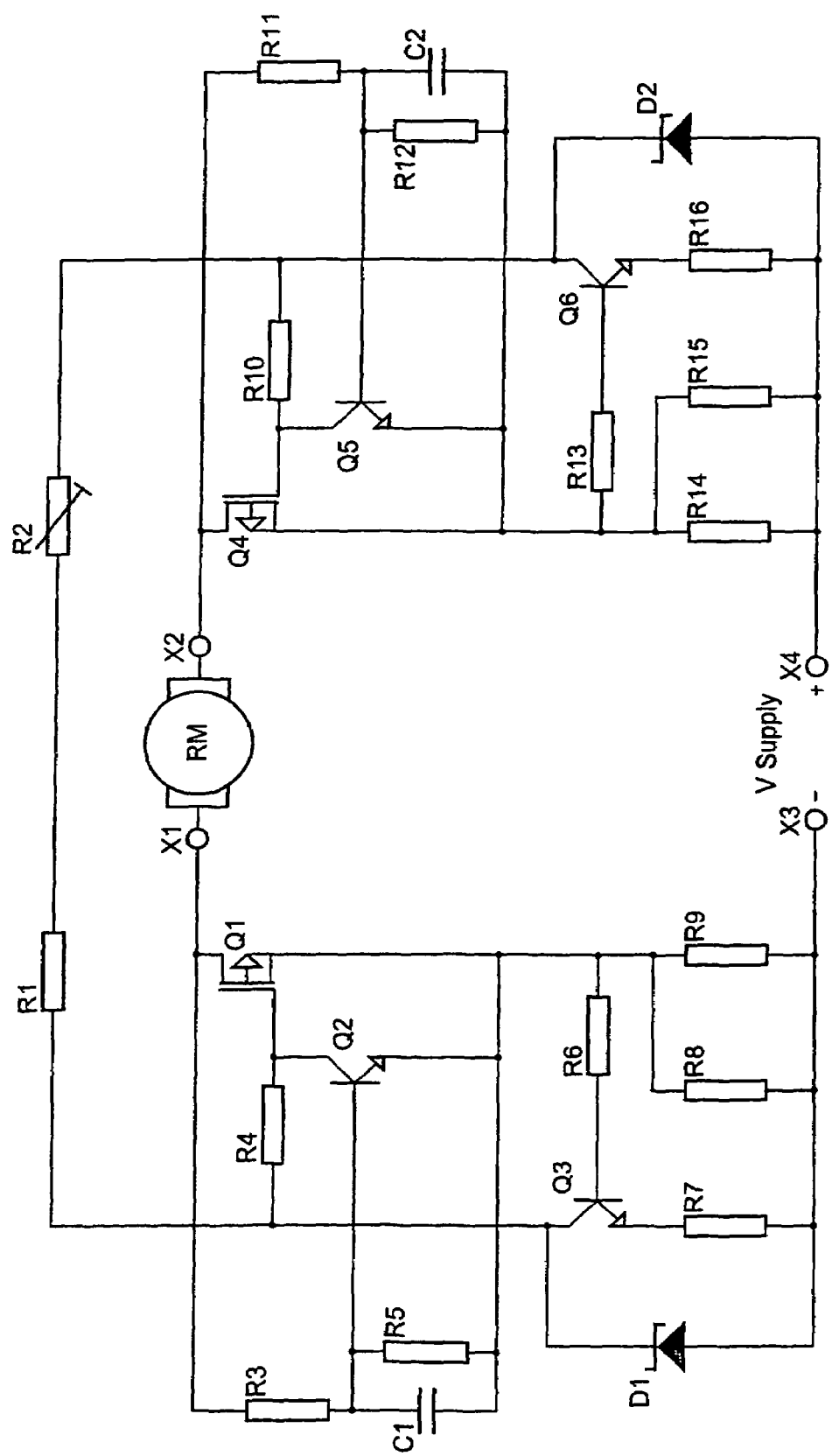
FIG. 2 depicts a circuit of both unipolar circuits for controlling the motor.

FIG. 2 depicts a complete circuit for a foldable vehicular external rear view mirror housing motor RM. The circuit is substantially symmetric so that one side can operate when one polarity of current is applied and other side can operate when the opposite polarity of current is applied. The common components being R1 and R2.

Figure 3:
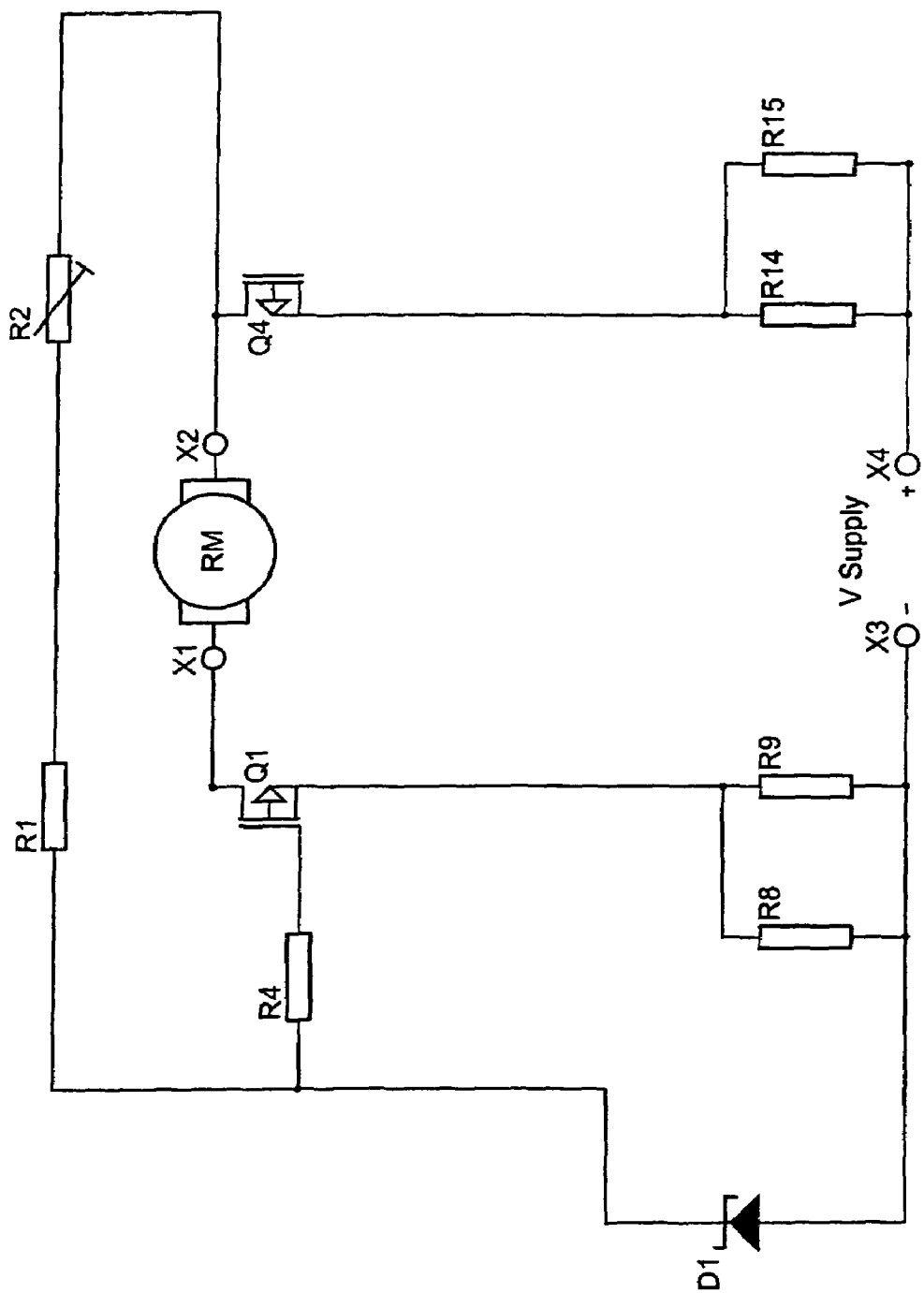
FIG. 3 depicts the portion of one of the unipolar circuits which is functional during normal running of the motor as it actuates the motor between a first and second position.

FIG. 3 depicts those components of the circuit which are primarily active during the application of current such that terminal X4 has a positive polarity and the motor RM is running.

A Current flows through the diode of Q4 (a parasitic diode which is available in transistors of this general type), through the motor RM, through Q1 and through current sense resistors R8 and R9. This diode provides reverse current blocking and over voltage protection but in other circuit configurations, a Zener diode of suitable characteristics could be across the output devices. In the preferred embodiment solid state switches Q1 and Q4 are each a Metal Oxide Silicon Field Effect Transistor (MOSFET) semiconductor transistor device.

Switching transistor Q1 is the same as Q4 and is biased into conduction through its source and sink by a voltage supplied via D1, R, R2 and R4. This voltage is sufficient to turn-on Q1 so that sufficient current can flow through the motor to drive the mechanism to which it is mechanically coupled.

It is merely preferable that current limiting is provided in this circuit configuration as it is equally possible to not have current limiting and allow the current to be controlled by the motor. For example, it is possible to detect the magnitude of the current being drawn and if the magnitude exceeds a predetermined level for a predetermined time, initiates switch off of the current. Both approaches rely on the motor current wherein detection is the same but one also limits the current.

Figure 4:
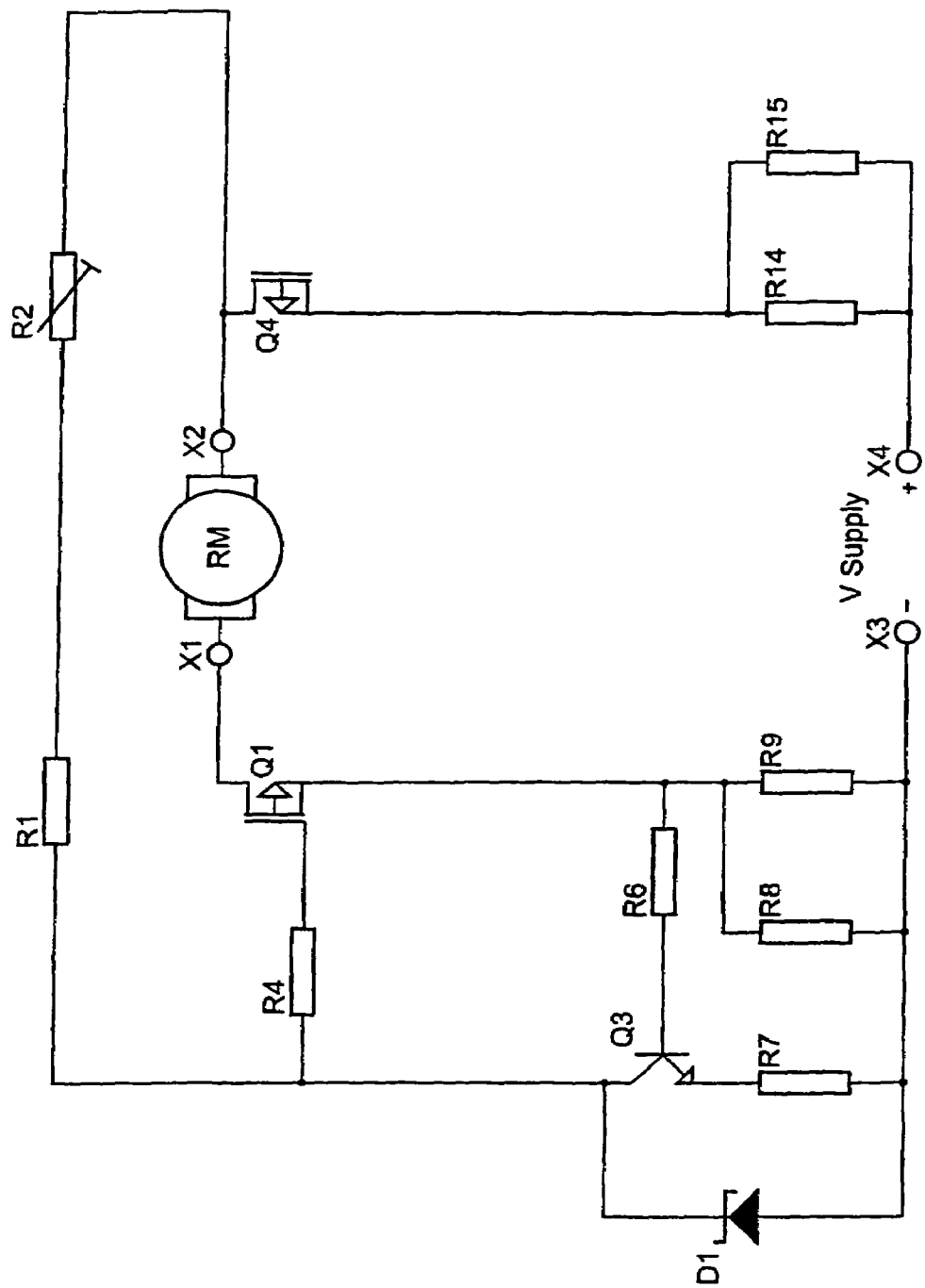
FIG. 4 depicts the portion of one of the unipolar circuits which is used to limit the current provided to the motor as well as temperature compensate the current limiting function.

FIG. 4 depicts those particular components of the circuit which are primarily active during the function of limiting current through the motor, but this is incidental to the end of travel detection.

Thus for the current limiting approach during normal operation, the current through R8 and R9 is such that the base voltage on Q3 is insufficient to cause Q3 to conduct between its collector and emitter. However, as the level of current flowing through the motor increases, the voltage on the base of Q3 increases and Q3 will begin to turn-on and conduct. As Q3 conducts more current, there is a reduction of on-bias of the main current switch Q1 via R4. Q1 thus conducts less current and current to the motor RM is thereby limited.

It is preferable however that the current limiting process be substantially consistent even with fluctuating temperature. Temperature compensation can be provided to accommodate a drive voltage of the main bipolar transistor Q1 which changes by approximately −1% for every +3° C.

In this embodiment collector current Q3 is provided via a thermistor R2 which has a negative temperature co-efficient. Thus as the ambient and component temperature rises, the current through the thermistor increases and the collector current through Q3 increases which partly off-sets the falling base voltage in Q3.

The increase in current through the thermistor R2 with increasing temperature will cause an increased voltage across R7. This voltage reduces the voltage appearing across the base emitter junction of Q3. The effect is to off-set the reduction in base emitter voltage required by Q3 with increased temperature. R7, R2 and R1 are chosen to give a best fit current versus temperature curve. R1 limits the maximum current that can flow when very high temperatures are experienced by the system. It is worth noting that temperature compensation can be used to produce other than flat responses to accommodate for material softening in the mechanics.

Figure 5:
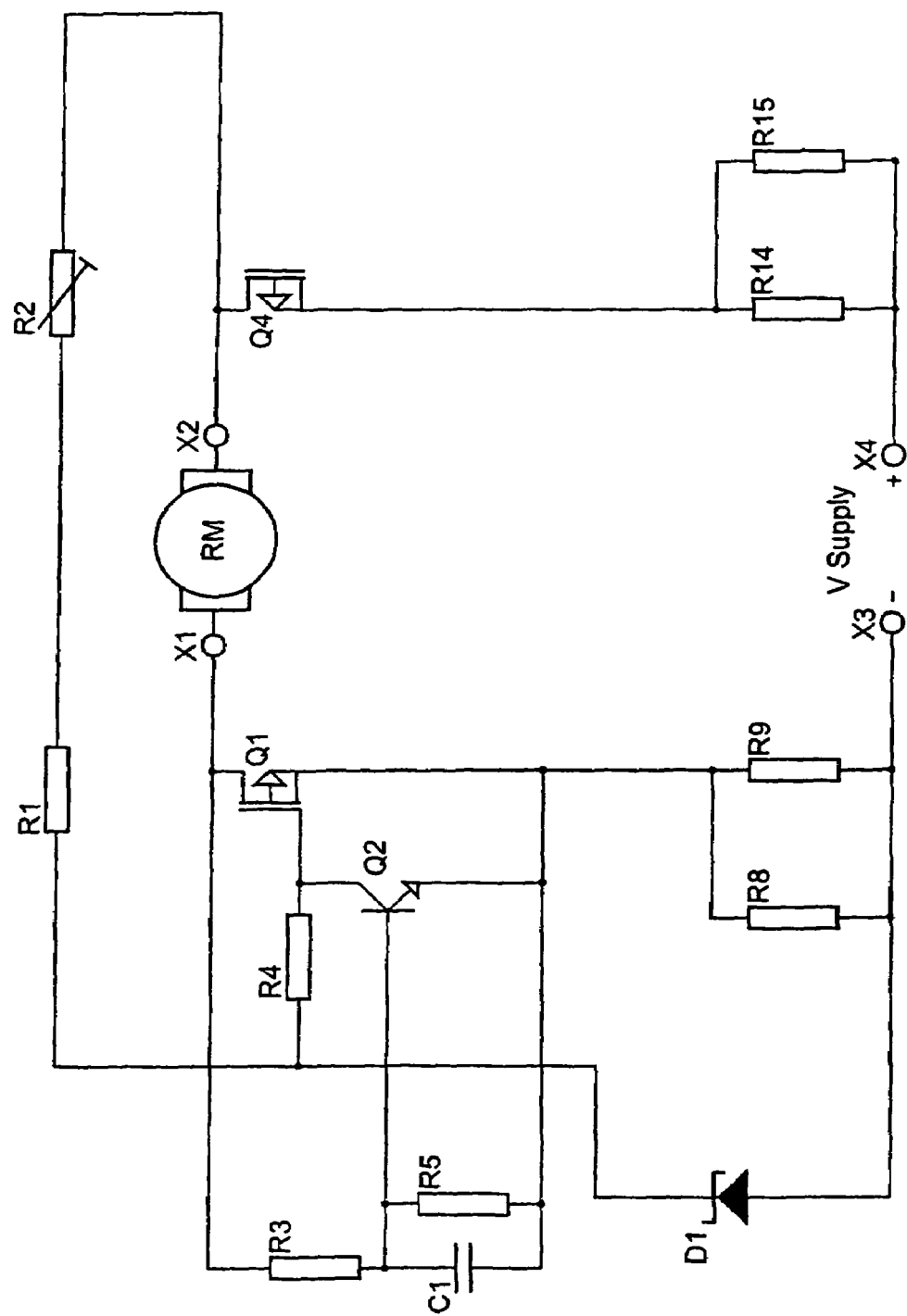
FIG. 5 depicts the portion of one of the unipolar circuits which is used to abruptly cut off current to the motor after a period of current limiting.

Referring to FIG. 5, when current limiting is occurring, the voltage across the solid state switch Q1 increases, hence reducing the voltage across the motor and with it the current. As the voltage across Q1 increases it also charges C1 via R3. Over a period of time C1 charges to a voltage such that Q2 turns-on and begins to conduct which in turn reduces the drive voltage of the main transistor solid state switch Q1.

This process accelerates as the period of current limiting increases and as current is reduced further the voltage across Q1 increases but raises the relative level of the base voltage on Q2 which in turn conducts more and thus brings down sharply the bias voltage applied to the main bi-polar transistor solid state switch Q1. This condition quickly reduces to substantially zero the conduction through Q1 and thereby the current flow which operates the motor.

R4 is chosen to keep to a minimum the current drawn by the circuit while Q1 is in the off-state.

With the exception of small bias currents, all primary current paths are conducted through the motor which is advantageous since transient voltage excursions from the supply are limited by the resistance and induction of the motor windings. A consequence of this design feature is that there is a reduced need for transient protection components.

A further advantage of the preferable circuit design, is the use of current limiting and the period of current limiting being used to determine the cut-off condition for current flowing through the motor. This is likely to result in less stress (mechanical and electrical) upon the motor when the mechanism to which it is connected reaches the end of its travel and also improves the Mean Time Between Failure (MTBF) of the motor actuated element.

A yet further advantage of the preferable circuit is the small quiscent current drawn once the MOSFET switch is turned off as indicated in relation to the selection of the value of R4.

Even though the circuit is arranged to detect an increasing current condition through the motor it does not necessarily know if this condition has occurred because the mechanism it actuates has actually reached one of its end of travel positions. Such a condition could occur if the mechanism is stopped unexpectedly intermediate its end of travel positions. Other sensors and circuits can then be used to ensure that the intended end of travel position has in fact been reached but these issues are not central to the problem addressed by the invention disclosed in this specification.

It will be appreciated by those skilled in the art, that the invention is not restricted in its use to the particular application described and neither is the present invention restricted in its preferred embodiment with regard to the particular elements and/or features described or depicted herein. It will be appreciated that various modifications can be made without departing from the principles of the invention, therefore, the invention should be understood to include all such modifications within its scope.

What is claimed is:

1. A motor control circuit for a direct current electric motor having a pair of direct current inputs supplied respectively from negative and positive current sources wherein said motor is actuated to turn a shaft in one of two directions dependant on which polarity of current is being provided to said motor, said control circuit comprising:

a pair of unipolar control circuits wherein one of said unipolar control circuits is connected between one of said current sources and a current input to said motor and the other unipolar control circuit is connected between said other current source and another input to said motor, and wherein said pair of unipolar control circuits operate said motor in opposite directions.

2. A motor control circuit according to claim 1 wherein each of said unipolar control circuits is substantially identical.

3. A motor control circuit according to claim 1 wherein each of said unipolar control circuits further comprises:

a solid state switch located between said motor current input and said source of direct current wherein the degree to which said solid state switch allows current to flow to said motor is controlled by an input bias signal to said switch, a current limiting member for adjusting said input bias signal according to the current flowing through said motor, such that said solid state switch adjusts said input bias to said solid state switch such that less current flows through said motor when a predetermined period of current limiting has occurred.

4. A motor control circuit according to claim 3 wherein said current limiting member further comprises a temperature compensation circuit.

5. A motor control circuit according to claim 4 wherein said temperature compensation circuit comprises a thermistor having a negative temperature co-efficient located in said circuit so that as the ambient temperature and control circuit temperature rises the current through the thermistor increases and said input bias signal to said solid state switch is compensated.

6. A motor control circuit according to claim 3 wherein said solid state switch member disengages said current flow to said motor when a predetermined period of current limiting has occurred.

7. A motor control circuit according to claim 3 wherein said solid state switch member disengages said current flow to said motor when current drawn by said motor exceeds a predetermined threshold current for a predetermined period of time.

8. A motor control circuit according to claim 3 wherein said current limiting member comprises:

a motor current sensing circuit comprising a shunt resistor arranged to carry a proportion of the current flowing through said motor and provide a respective voltage to the base of a bipolar transistor which is arranged to turn on at a predetermined voltage level representative of the current flowing through said motor at which it should be switched off, such that said bipolar transistor turns on when said predetermined voltage level is reached and which decreases the input bias to said solid state switch to lessen the current though said motor.

9. A motor control circuit according to claim 1 wherein at least one of said pair of unipolar control circuits conducts current to complete the circuit to allow said motor to operate.

10. A motor control circuit according to claim 1 wherein at least one of said unipolar control circuits further comprises:

a solid state switch located between said motor current input and said source of direct current wherein the degree to which said solid state switch allows current to flow to said motor is controlled by an input bias signal to said solid state switch, a current detection member to detect the magnitude of current being drawn through said motor and if said magnitude exceeds a predetermined level for a predetermined time reduce said input to said switch.

11. A motor control circuit according to claim 1 wherein current is primarily conducted through said motor.

12. A motor control circuit for a direct current electric motor comprising:

a pair of direct current inputs supplied respectively from negative and positive current sources, wherein said motor is actuated to turn a shaft in one of two directions dependent on which polarity of current is provided to said motor;

a pair of unipolar control circuits each comprising a solid state switch located between said motor current input and said source of direct current, said solid state switch being adapted to operate said motor in one of two directions, wherein the degree to which said solid state switch allows current to flow to said motor is controlled by an input bias signal to said switch; and a current limiting member for adjusting said input bias signal according to the current flowing through said motor, such that said solid state switch adjusts said input bias to said solid state switch such that less current flows through said motor when a predetermined period of current limiting has occurred.

13. A motor control circuit according to claim 12 wherein said current limiting member further comprises a temperature compensation circuit.

14. A motor control circuit according to claim 13 wherein said temperature compensation circuit comprises a thermistor having a negative temperature co-efficient located in said circuit so that as the ambient temperature and control circuit temperature rises the current through the thermistor increases and said input bias signal to said solid state switch is compensated.

15. A motor control circuit according to claim 12 wherein said solid state switch member disengages said current flow to said motor when a predetermined period of current limiting has occurred.

16. A motor control circuit according to claim 12 wherein said solid state switch member disengages said current flow to said motor when current drawn by said motor exceeds a predetermined threshold current for a predetermined period of time.

17. A motor control circuit according to claim 12 wherein said current limiting member comprises:

a motor current sensing circuit comprising a shunt resistor arranged to carry a proportion of the current flowing through said motor and provide a respective voltage to the base of a bipolar transistor which is arranged to turn on at a predetermined voltage level representative of the current flowing through said motor at which it should be switched off, such that said bipolar transistor turns on when said predetermined voltage level is reached and which decreases the input bias to said solid state switch to lessen the current though said motor.

18. A motor control circuit for a direct current electric motor comprising:

a pair of direct current inputs supplied respectively from negative and positive current sources, wherein said motor is actuated to turn a shaft in one of two directions dependent on which polarity of current is provided to said motor;

a pair of unipolar control circuits each comprising a solid state switch located between said motor current input and said source of direct current, said solid state switch being adapted to operate said motor in one of two directions, wherein the degree to which said solid state switch allows current to flow to said motor is controlled by an input bias signal to said switch; and a current detection member to detect the magnitude of current being drawn through said motor and if said magnitude exceeds a predetermined level for a predetermined time reduce said input to said switch.

* * * * *